Aug. 7, 1923. Re. 15,669

P. J. HINDMARSH

DRIVING CAP FOR FENCEPOSTS

Original Filed April 3, 1922

Witnesses:
Edwin Trueb

Inventor:
PERCY J. HINDMARSH,
by:
D. Anthony Usina
his Attorney.

Reissued Aug. 7, 1923. Re. 15,669

UNITED STATES PATENT OFFICE.

PERCY J. HINDMARSH, OF LINCOLN, NEBRASKA, ASSIGNOR TO THE AMERICAN STEEL AND WIRE COMPANY OF NEW JERSEY, A CORPORATION OF NEW JERSEY, AT HOBOKEN, NEW JERSEY.

DRIVING CAP FOR FENCEPOSTS.

Original No. 1,444,834, dated February 13, 1923, Serial No. 549,244, filed April 3, 1922. Application for reissue filed June 27, 1923. Serial No. 648,150.

*To all whom it may concern:*

Be it known that I, PERCY J. HINDMARSH, a citizen of the United States, and resident of Lincoln, in the county of Lancaster and State of Nebraska, have invented certain new and useful Improvements in Driving Caps for Fenceposts, of which the following is a specification.

This invention relates to fence posts and more particularly to driving caps for such posts, and has for one of its objects the provision of an improved cap of this class that will facilitate the driving of tubular fence posts and one that may be readily removed therefrom after the driving operation is completed.

Another object of this invention is to provide a cap of novel construction that will not damage the integral attaching tongues formed on the posts for attaching the fencing thereto.

A still further object is to provide a cap having the novel construction, arrangement, and combination of parts illustrated in the accompanying drawings and described in the following specification.

In the drawings, Figure 1 is a side elevation of a fence post having my invention applied thereto.

Figure 1:
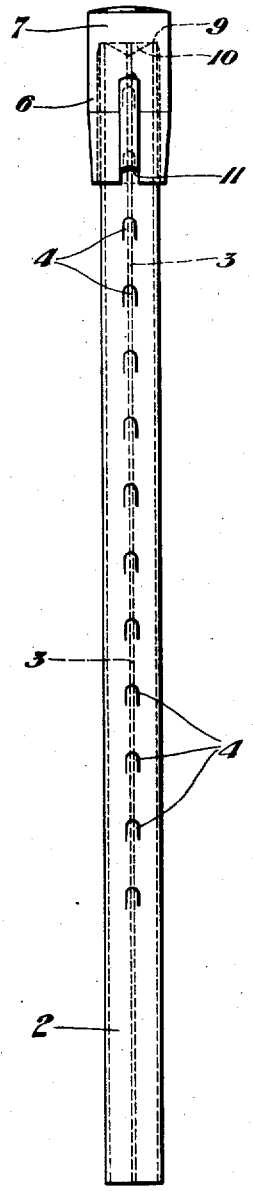
Figure 2:
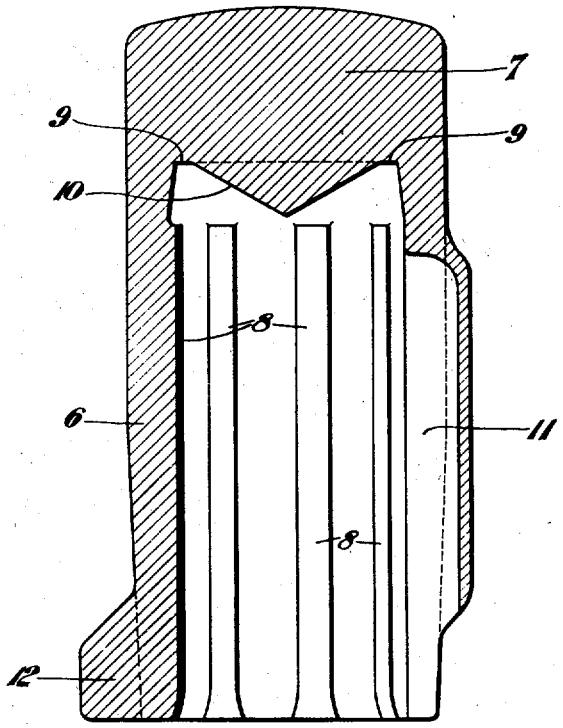
Figure 2 is a vertical sectional elevation of the driving cap.
Figure 3:
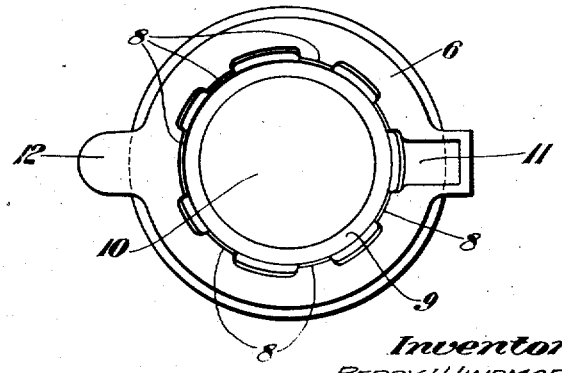
Figure 3 is a bottom plan of the driving cap.

The fence post illustrated in the drawings is of a standard and well known design and comprises a tubular body portion 2 formed from a flat sheet of metal having its longitudinal edges abutting, forming an open seam 3. A series of tongues or lugs 4 are struck from the post and form means for attaching the fencing to the posts.

Fence posts of this construction are adapted to be driven into the ground manually by a sledge or maul, and it will be readily understood that unless some means is provided for protecting the upper end of the post and preventing it from spreading it will be damaged and the open seam 3 will spread. Therefore I have provided the detachable driving cap of this invention.

The driving cap comprises a driving head 7, having a hollow substantially cylindrical body portion or annular flange 6 extending downwardly therefrom. The inner side faces of said body or flange are fluted to form longitudinally extending spaced ribs 8 which project inwardly. The internal diameter of the portion 6 at the face of the ribs 8 is such as will closely fit the upper end of the post 2.

The upper closed end of the body portion of the cap is provided on its inner surface with a flat finished circular bearing portion 9 adapted to contact with the upper end face of the post 2 so as to get a true bearing over the entire upper end of the post. A frusto conical projection 10 extends downwardly from the inner face of the closed end 7 of the cap and is adapted to extend into the upper end of the post 2 to prevent the post buckling inwardly while being driven into the ground.

The body portion 6 of the cap is provided with a longitudinally extending hollow projection or recess 11 adapted to provide clearance for the tongues or lugs 4 of the post 2. A solid lug 12 is provided at a point diametrically opposite the projection 11 adapted to receive driving blows when removing the cap from the post after it has been driven into the ground.

While I have shown only one specific embodiment of my invention it will be understood that I do not wish to be limited to the specific construction shown, since various modifications may be made without departing from the scope of my invention as defined in the appended claims.

I claim:—

1. A driving cap for fence posts comprising a driving head, an annular flange extending downwardly from said head forming a hollow body portion adapted to fit over a post, and longitudinally extending ribs projecting inwardly from the inner side face of said flange adapted to engage the side walls of the post.

2. A driving cap for fence posts comprising a driving head, an annular flange extending downwardly from said head forming a hollow body portion adapted to fit over a post, said flange having a longitudinally extending recess to form clearance for projections on the post, and bearing projections extending inwardly from the inner side face of said flange adapted to engage the side walls of the post.

3. A driving cap for fence posts comprising a driving head, an annular flange extending downwardly from said head forming a hollow body portion adapted to fit over a post, bearing projections extending inwardly from the inner side face of said flange adapted to engage the side walls of the post, and a lug extending outwardly from the bottom edge of said flange adapted to receive driving blows in removing the cap from the post.

4. A driving cap for fence posts comprising a solid driving head, an annular flange extending downwardly from said head forming a hollow body portion adapted to fit over a post, said flange being provided with a longitudinally extending recess to form clearance for projections on the post, a lug projecting outwardly from said flange adjacent its lower end, and at a point diametrically opposite said recess adapted to receive driving blows in removing the cap from the post, and longitudinally extending ribs projecting inwardly from the inner side face of said flange and adapted to engage the side walls of the post.

In testimony whereof I have hereunto set my hand.

PERCY J. HINDMARSH.